US008226800B2

(12) United States Patent
Passarelli

(10) Patent No.: US 8,226,800 B2
(45) Date of Patent: Jul. 24, 2012

(54) WATER DESALINATION SYSTEM

(75) Inventor: Frank Passarelli, Los Angeles, CA (US)

(73) Assignee: Water Desalination International, Inc., Los Angeles, CA (US)

( * ) Notice: Subject to any disclaimer, the term of this patent is extended or adjusted under 35 U.S.C. 154(b) by 782 days.

(21) Appl. No.: 12/335,165

(22) Filed: Dec. 15, 2008

(65) Prior Publication Data

US 2010/0147673 A1    Jun. 17, 2010

(51) Int. Cl.
*B01D 3/10* (2006.01)
*B01D 3/34* (2006.01)

(52) U.S. Cl. .............................. 203/10; 203/96

(58) Field of Classification Search .............. 202/167, 202/233, 236, 265, 267.1, 270; 203/10, 11, 203/89, 90; 159/3, 4.01, 4.04, 4.06, 4.07, 159/4.2, 4.4, 8, 16.3, 29
See application file for complete search history.

(56) References Cited

U.S. PATENT DOCUMENTS

| | | | | |
|---|---|---|---|---|
| 603,543 | A * | 5/1898 | Underwood | 159/13.3 |
| 1,219,413 | A * | 3/1917 | Donk | 530/226 |
| 1,917,841 | A * | 7/1933 | Hughes et al. | 159/16.3 |
| 1,945,281 | A * | 1/1934 | Leithauser | 159/45 |
| 2,103,521 | A * | 12/1937 | Luly | 159/31 |
| 2,315,201 | A * | 3/1943 | Haltmeier | 423/356 |
| 2,395,959 | A * | 3/1946 | Soday | 203/29 |
| 3,146,609 | A * | 9/1964 | Engalitcheff, Jr. | 62/305 |
| 3,361,645 | A * | 1/1968 | Bodell | 202/177 |
| 3,440,147 | A * | 4/1969 | Rannenberg | 203/11 |
| 3,491,822 | A * | 1/1970 | Jonke et al. | 159/48.1 |
| 3,597,329 | A * | 8/1971 | Brown | 203/11 |
| 3,619,380 | A * | 11/1971 | Stephens | 202/180 |
| 3,856,632 | A | 12/1974 | Peter | |
| 3,864,215 | A * | 2/1975 | Arnold | 203/11 |
| 3,901,768 | A | 8/1975 | Steinbruchel | |
| 3,997,408 | A | 12/1976 | Barba et al. | |
| 4,441,963 | A | 4/1984 | Li | |
| 4,537,039 | A | 8/1985 | Fearon | |
| 4,543,165 | A | 9/1985 | Capella | |
| 4,555,307 | A | 11/1985 | Hagen | |
| 4,734,167 | A | 3/1988 | Goeldner | |
| 5,123,481 | A | 6/1992 | Albers et al. | |
| 5,232,556 | A | 8/1993 | Passarelli | |
| 5,248,394 | A | 9/1993 | Schlesinger et al. | |

(Continued)

FOREIGN PATENT DOCUMENTS

JP    10-272453 A    10/1998

(Continued)

*Primary Examiner* — Duane Smith
*Assistant Examiner* — Patrick McCarty
(74) *Attorney, Agent, or Firm* — Crowell & Moring LLP

(57) ABSTRACT

An improved water desalination system is disclosed, in which contaminated water such as seawater or brackish water is preheated and fed into a primary pressure vessel through a distribution head. The seawater is distributed from the distribution head over a non-adherent surface such as a plurality of silicone chords hanging below a distribution tank or a cone- and cylindrical-shaped surface. The water is exposed to a high temperature steam environment in the chamber to cause at least a portion of the water in the contaminated water to evaporate, while the remaining concentrated salts from the contaminated water fall to the bottom of the chamber. A portion of the steam in the primary pressure vessel is withdrawn to be condensed into fresh water. The energy withdrawn with the steam extracted from the primary pressure vessel is made up by a supplemental energy apparatus, such as a steam generator.

7 Claims, 3 Drawing Sheets

U.S. PATENT DOCUMENTS

| | | | |
|---|---|---|---|
| 5,349,981 A * | 9/1994 | Schmucki et al. | 137/430 |
| 5,458,739 A * | 10/1995 | Boucher et al. | 202/153 |
| 5,496,448 A * | 3/1996 | Vuong | 202/235 |
| 5,536,375 A | 7/1996 | Vogelman | |
| 5,738,762 A * | 4/1998 | Ohsol | 203/11 |
| 5,772,850 A | 6/1998 | Morris | |
| 5,810,975 A | 9/1998 | Bourdel | |
| 5,810,977 A * | 9/1998 | Annecharico et al. | 203/10 |
| 5,820,748 A * | 10/1998 | Shadikhan | 208/179 |
| 5,833,812 A | 11/1998 | Hartman | |
| 6,436,242 B1 | 8/2002 | Sanchez Belmar | |
| 7,251,944 B2 * | 8/2007 | Holtzapple et al. | 62/93 |
| 7,413,634 B1 | 8/2008 | Napier | |
| 2002/0074106 A1 * | 6/2002 | van der Veen | 165/104.11 |
| 2003/0132095 A1 * | 7/2003 | Kenet et al. | 202/182 |
| 2005/0051418 A1 | 3/2005 | Lama | |
| 2005/0115819 A1 | 6/2005 | Lai | |
| 2006/0272933 A1 | 12/2006 | Domen et al. | |
| 2007/0051611 A1 * | 3/2007 | Rives et al. | 202/83 |
| 2008/0105534 A1 | 5/2008 | Taylor et al. | |

FOREIGN PATENT DOCUMENTS

| | | | |
|---|---|---|---|
| KR | 2006061431 | * | 6/2006 |
| WO | WO 2006/073346 A1 | | 7/2006 |
| WO | WO2008026196 | * | 3/2008 |

* cited by examiner

WATER DESALINATION SYSTEM

BACKGROUND AND SUMMARY OF THE INVENTION

The present invention relates to production of fresh water from seawater or other brackish water by desalination.

Desalination is the process of converting seawater, which contains 35,000 parts per million of salt, or brackish water, containing 4,000 to 10,000 parts per million of salt, to fresh water suitable for human consumption, household and industrial requirements. The salt in drinking water should not exceed 500 parts per million. Regardless of the source, water containing dissolved solids and other undesired substances may be referred to as contaminated water.

Production of fresh water by many types of evaporators and reverse osmosis devices has been known. However the equipment and facilities required by these processes have been very expensive and troublesome when used continuously on a large scale. For example, as temperatures exceed 160 degrees Fahrenheit in an evaporator, fouling of the water separation surfaces by scale deposits from the seawater or brackish water occur as insoluble compounds, such as calcium and magnesium salts, are left behind as water is removed. These deposits interfere with the operation and the thermodynamic efficiency of the desalination plant. In addition, operation and maintenance of such prior desalination facilities is also costly and time consuming, as these facilities require technicians to monitor complicated multi-step processes and clean and repair a large amount of process unit equipment. Improvement in efficiency and desalination system design to lower energy needs and eliminate costly evaporator fouling and maintenance requirements is needed.

The present invention provides a novel desalination apparatus and method which, after the system reaches operating temperatures and pressures, requires only relatively small amounts of additional heat energy to sustain the desalination process. In one embodiment of the present invention, a desalination plant includes a heat exchanger in which incoming seawater receives heat from fresh water leaving the desalination plant, a pressure vessel which receives the heated seawater, a water distribution unit comprising a distribution platform and a plurality of silicone strips hanging below the platform. The heated seawater is distributed to the tops of the silicone strips, and flows by gravity down the surface of the silicone strips. As the seawater flows down the silicone strips, it spreads across the strips, increasing its surface area to promote evaporation of water from the seawater. In addition, the seawater flowing down the silicone strips is also heated by the high temperature steam in the atmosphere within the pressure vessel, enhancing evaporation of the water from the seawater on the silicone strips. The water released from the seawater enters the pressure vessel atmosphere, where it can be drawn off for recovery as fresh water.

As the now-concentrated salts in the brine produced from evaporation of the water reaches the ends of the silicone strips, it falls to the bottom of the pressure vessel. From this location, the salts may be removed by conventional techniques, such as pumping or use of a salt auger. The high purity sea salts remaining after removal of the remaining water from the brine may be marketed and sold, providing a valuable income stream which helps increase the economic efficiency of the desalination plant. Alternatively in the case of seawater, the sea salts may be returned to the body of water from which they originated. As an alternative to use of a device such as a salt auger, the bottom of the pressure vessel may be equipped with at least a pair of sliding blade sets which permit controlled salt extraction. One of the blade sets sits on the bottom of the pressure vessel, and in their normal position block off a plurality of holes through the bottom of the pressure vessel. The other blade set is disposed on the outside of the pressure vessel, and are also arranged to permit the blades to block off the plurality of holes. Through coordinated movement of the blade sets, salt may be extracted from the bottom of the pressure vessel on an as-desired basis. Due to the desire to maintain positive control over the flow of salt from the pressure vessel to prevent blow-out of steam and water from the steam environment above the salt pile, it would be preferred to have the movement of the blade sets be coordinated by a computer controller, with the blade sets' movement controlled to occur only during predefined plant conditions.

An additional benefit of this embodiment of the present invention is that because the chemicals and minerals introduced with the seawater do not adhere to the silicone strips, there is no significant build-up of fouling on the strips. This naturally self-cleaning system provides a significant reduction in personnel and maintenance costs, and helps to provide long operating cycles between system shutdowns.

As energy is transferred from the high temperature steam within the pressure vessel environment to the seawater being introduced into the pressure vessel, an energy source must replenish the heat energy in the steam environment to maintain the desalination process. Preferably, the supplemental energy is provided by a heat addition device which does not require high maintenance, such as a steam generator. In other embodiments, the supplemental heat energy source may include other energy sources which, when preferably coupled with a steam generator, provide an energy efficient approach to supplying sufficient volumes of high temperature and pressure steam.

In a further embodiment, as a portion of the steam in the primary evaporation chamber pressure vessel is drawn off to be condensed into fresh water and delivered from the desalination plant, the steam may pass from the pressure vessel to a condensation chamber within a secondary pressure vessel via a turbine. The turbine extracts energy from the steam, both to condition the steam prior to condensation, and to provide a source of power (electrical and/or mechanical) which may be used to operate the desalination plant, further enhancing overall plant efficiency, and/or provided to outside consumers.

In an alternative embodiment, in place of the above-mentioned distribution tank and silicone chords, the incoming seawater or brackish water may be dispensed from a feed inlet onto the upper surface of a shape, such as a cone; coated with silicone or TEFLON® to resist contaminant adhesion. As with the above-noted silicone chords, as the seawater is dispersed across the surface of the cone it receives heat energy from the surrounding steam environment to evaporate at least a portion of the water from the seawater. Advantageously, in addition to the heat energy received from the steam environment within the evaporation space, additional heat energy may be added to the seawater by heating the underside surface of the cone from below with steam injected into the space underneath the cone. Further heat transfer to the seawater may be obtained by extending the surface on which the seawater is spread, downward from the outer periphery of the cone shape in a generally cylindrical fashion. This vertical cylindrical surface, also coated with an adhesion-resistant material, not only provides additional surface area over which heat energy may be added to the seawater from the steam environment, it also helps contain the steam injected in the region beneath the cone shape against the interior surfaces of the seawater heating assembly for a longer period, enhancing heat transfer to the surfaces and the seawater.

The novel desalination apparatus and operating method of the present invention offers significant advantages over previous desalination units, including reducing desalination plant operating costs, both in terms of reduced maintenance and staffing needs, and high energy efficiency as after initial start-up, the present invention requires only supplemental energy inputs into the system in order to maintain the seawater evaporation process on the silicone strips. A further advantage of the present invention is that hard-to-remove chemical compound deposits are virtually eliminated on the desalination process equipment, because contaminates such as calcium and magnesium salts do not readily adhere to silicone and thus readily fall off of the silicone strips to the bottom of the pressure vessel.

Other objects, advantages and novel features of the present invention will become apparent from the following detailed description of the invention when considered in conjunction with the accompanying drawings.

DETAILED DESCRIPTION OF THE DRAWINGS

Figure 1:
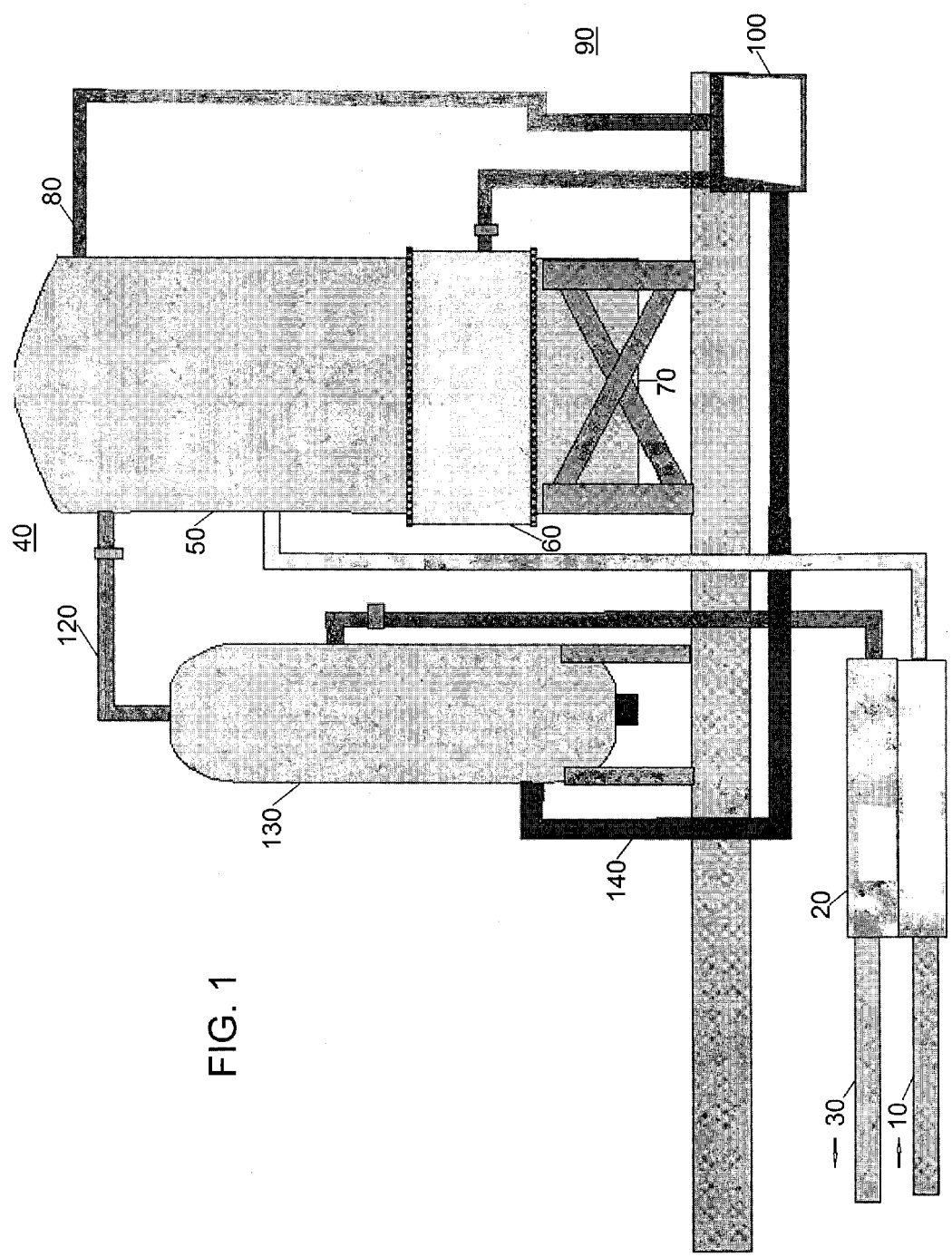
FIG. 1 is a schematic representation of an embodiment of a desalination plant in accordance with the present invention.
Figure 2:
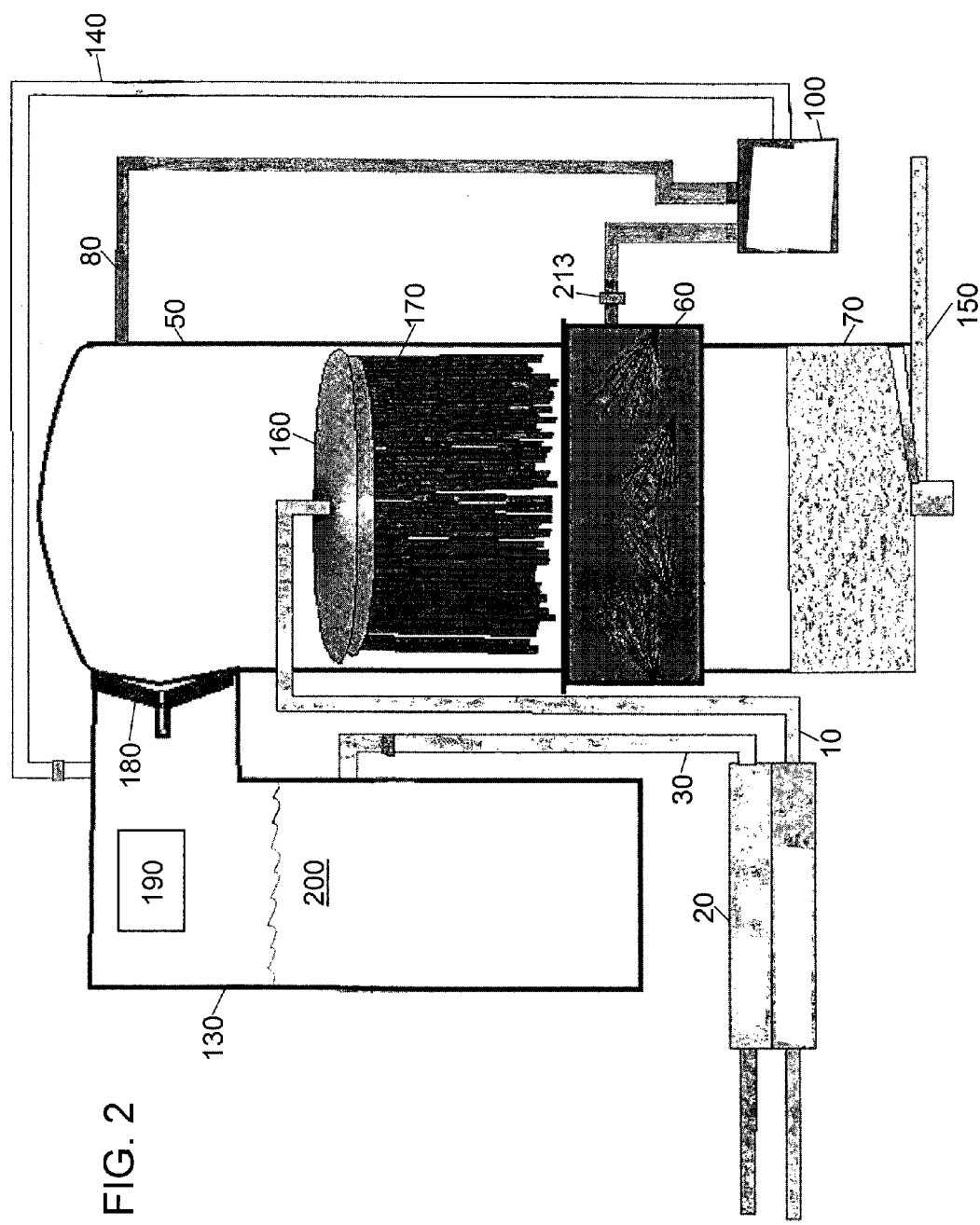
FIG. 2 is another schematic representation, in cross-section, of an embodiment of the present invention similar to the FIG. 1 embodiment.

FIG. 1 schematically illustrates an embodiment of a desalination plant, with FIG. 2 illustrating details of another embodiment similar to FIG. 1, with slightly different external piping arrangements but the same structure within the primary evaporation vessel.

In the present invention, seawater or brackish water is introduced into the desalination plant via a conduit 10. The seawater passes through a heat exchanger 20, where its temperature is raised by heat exchange from a flow of fresh water leaving the desalination plant through conduit 30. Preferably, the incoming seawater temperature is raised by the exiting fresh water from ambient to at or near the boiling point of water at atmospheric pressure, 212° F.

Following heating in heat exchanger 20, the heated seawater is conveyed to the primary pressure vessel 40, which includes the primary evaporation chamber of the desalination plant. As shown in FIG. 2, the pressure vessel 40 includes three main sections, the evaporation chamber 50 in which fresh water is generated by evaporation, the steam injection section 60 through which supplemental energy is added to the pressure vessel 40, and the brine collection section 70 which receives the residue remaining after evaporation of water from the incoming seawater or brackish water. Each of these sections will be discussed in additional detail, below.

Fresh water, generated in a manner described further below, is extracted in the form of steam from the primary evaporation chamber 50 via a passage 120 to a secondary pressure chamber 130 (also referred to as the condensation pressure vessel). The steam supplied to the secondary pressure chamber 130 will ultimately be condensed into the fresh water product, as described further below.

Steam energy may also be extracted from the primary evaporation chamber 50 via pipe 80, which feeds the steam to an energy supplementing apparatus (in this embodiment, a steam generator 100). The steam supplied from the primary evaporation chamber 50 is heated in steam generator 100 such that when reintroduced into the pressure vessel 40 through steam injection section 60, the steam conveys sufficient energy into the pressure vessel to compensate for the heat energy being removed from the primary evaporation chamber 50 in the steam entering secondary pressure chamber 130. Those of ordinary skill in the art will recognize that in steady-state fresh water production operations, the mass flow rate of steam removed from the primary evaporation chamber 50 to be condensed into fresh water must be equal to the mass flow rate of the seawater or brackish water entering chamber 50. Thus, in steady-state operations the amount of heat energy being added to the primary evaporation chamber from steam injection section 60 must correspond to the amount of heat required to evaporate the water from the incoming seawater and maintain the steam environment within the primary evaporation chamber 50.

In the delivery of steam from the primary evaporation chamber 50 to secondary pressure chamber 130 for fresh water production, the steam pressure and temperature are reduced, preferably to approximately atmospheric pressure, so that the steam is condensed into fresh water. The condensed water is then fed through conduit 30 to heat exchanger 20 to both increase the incoming seawater temperature and to further reduce the fresh water temperature to facilitate downstream handling of the fresh water. The heat transfer to the incoming seawater also has the benefit of minimizing energy loss from the desalination plant by re-injecting some of the energy removed from the primary evaporation chamber 50 when the steam is extracted for condensation into fresh water. This recovery of energy assists in increasing the overall efficiency of the desalination plant.

Features of the present invention shown in FIG. 2 which are not illustrated in FIG. 1 include: a salt auger 150 for removing salt from the salt collection section 70 of pressure vessel 50; a seawater distribution head 160 (in this embodiment, a flat, round tank) with silicone evaporation chords 170 which receive seawater from the distribution head 160; a turbine 180; and an optional heat exchanger 190 for extracting additional heat from the steam arriving from the primary evaporation chamber.

As an alternative to the turbine 180 (discussed further, below), the flow path between the primary evaporation chamber section 50 and the secondary pressure chamber 130 may include a moisture separator to remove liquid water drops from the steam flow. As an alternative to heat exchanger 190, if energy is removed from the steam arriving from the primary evaporation chamber by other processes (such as work extraction by a turbine or heat transfer to plant equipment) in sufficient amounts to allow the steam to condense into fresh water 200, the heat exchanger 190 need not be included in the desalination plant.

The operation of the FIG. 2 embodiment is as follows. This description assumes that the desalination plant is in a steady-state operating status, with all elements at their normal operating temperatures and pressures. Seawater enters the desalination plant through conduit 10 at ambient temperature, typically between 60° F. and 100° F., and enters heat exchanger 20. The temperature of the seawater is increased by heat energy from the fresh water being extracted from the secondary pressure chamber 130 via conduit 30, thereby recycling the heat energy back into the desalination plant and increasing overall plant efficiency. The heated seawater leaving heat exchanger 20 is transferred to the primary evaporation chamber 50, where it is delivered to the tank of distribution head 160. If necessary to overcome a pressure difference between the primary evaporation chamber 50 and conduit 10, the seawater pressure may be increased, for example, by a pump (not illustrated).

The seawater in the distribution head tank enters the steam environment of the primary evaporation chamber 50 by being released from the bottom of the tank to the top ends of silicone chords 170. As the seawater beings to flow down the chords 170 under the influence of gravity, it begins to absorb heat energy from the high temperature steam in the primary evaporation chamber. The energy steam generator 100 maintains the temperature of the steam in the primary chamber above the temperature of the incoming seawater, preferably at a few degrees higher, to promote evaporation of the seawater (for example, in this embodiment temperature in the primary evaporation chamber is maintained at approximately 214° F.). As the seawater proceeds further down the chords, the continuing heat input from the primary evaporation chamber steam environment causes the water in the seawater to evaporate from the chords and enter the primary chamber steam environment.

As the seawater proceeds down the silicone chords, the evaporation of water from the chords causes the concentration of chemicals in the remaining liquid to increase, until only a concentrated brine remains by the time the lower ends of the chords are reached. Despite the high salts concentration in the brine, because the silicone material of the chords does not bond with the salts, no significant amount of the highly concentrated salts adheres to the chords. Accordingly, the concentrated salts drop to the bottom of the pressure vessel 40 into the brine collection section 70.

The accumulated salts may be periodically or continuously removed from the bottom of the pressure vessel, in this embodiment by salt auger 150, for recovery and either further distribution or disposal. The lack of adherence of the salts to the silicone chords 170 provides one of the significant advantages of the present invention, a fresh-water evaporation surface which does not require shut down of the fresh water production process for extensive periodic maintenance to remove fouling experienced in conventional desalination plants.

While seawater is being introduced into the primary evaporation chamber 50, steam is also being withdrawn from the primary chamber to the secondary chamber for conditioning of the steam and accumulation of fresh water in its liquid state. Because the steam in the primary chamber is at a high temperature and corresponding high enthalpy, energy must be removed to permit condensation into liquid fresh water. In this embodiment, the extracted primary chamber steam enters turbine 180, turns the turbine 180 to convert the heat energy into mechanical energy suitable for, for example, electric power generation. The depleted steam emerges from the turbine 180 preferably at or near the steam saturation point at atmospheric pressure (i.e. at approximately 212° F.). The exhausted saturated steam then may condense into liquid form and accumulate in liquid fraction 200 in the lower portion of secondary chamber 130. This condensation process may proceed by transfer of the latent heat of vaporization to the environment around the secondary pressure chamber 130, or may be accelerated by heat exchangers, represented by schematically-illustrated heat exchanger 190, which absorb and remove heat energy from the secondary chamber. As an alternative, condensation may be assisted by placing heat exchanger 20 inside the secondary chamber 130, where the latent heat of vaporization which must be removed from the steam is transferred to the seawater entering the desalination plant.

In order to compensate for the heat energy absorbed by the seawater entering the primary evaporation chamber and the heat energy departing the primary chamber for condensation of the fresh water product, additional energy is provided to the desalination process by the energy supplementing apparatus 100. In this embodiment, supplemental steam heated to approximately 214° F. and at a pressure of approximately 26 psi is provided though valve 213 to steam injection section 60, which contains a plurality of steam injection apertures. The steam injection section 60 is located directly beneath the silicone chords 170 so that its heat energy may be immediately transferred to the incoming seawater to enhance the extraction of the water from the seawater by evaporation.

As an alternative to supply of steam from the primary evaporation portion 50 to steam generator 100 via pipe 80, the energy supplementing system adds heat energy to high temperature fresh water taken from the secondary pressure chamber 130 via pipe 140. Because this approach takes condensed fresh water from the secondary pressure chamber 130 at over 200° F., the heat energy given contained in this fresh water remains in the desalination plant, increasing the overall efficiency of the plant, helping minimize the amount and cost of energy required to raise the temperature and pressure of the water to the desired supplemental steam level.

Figure 3:
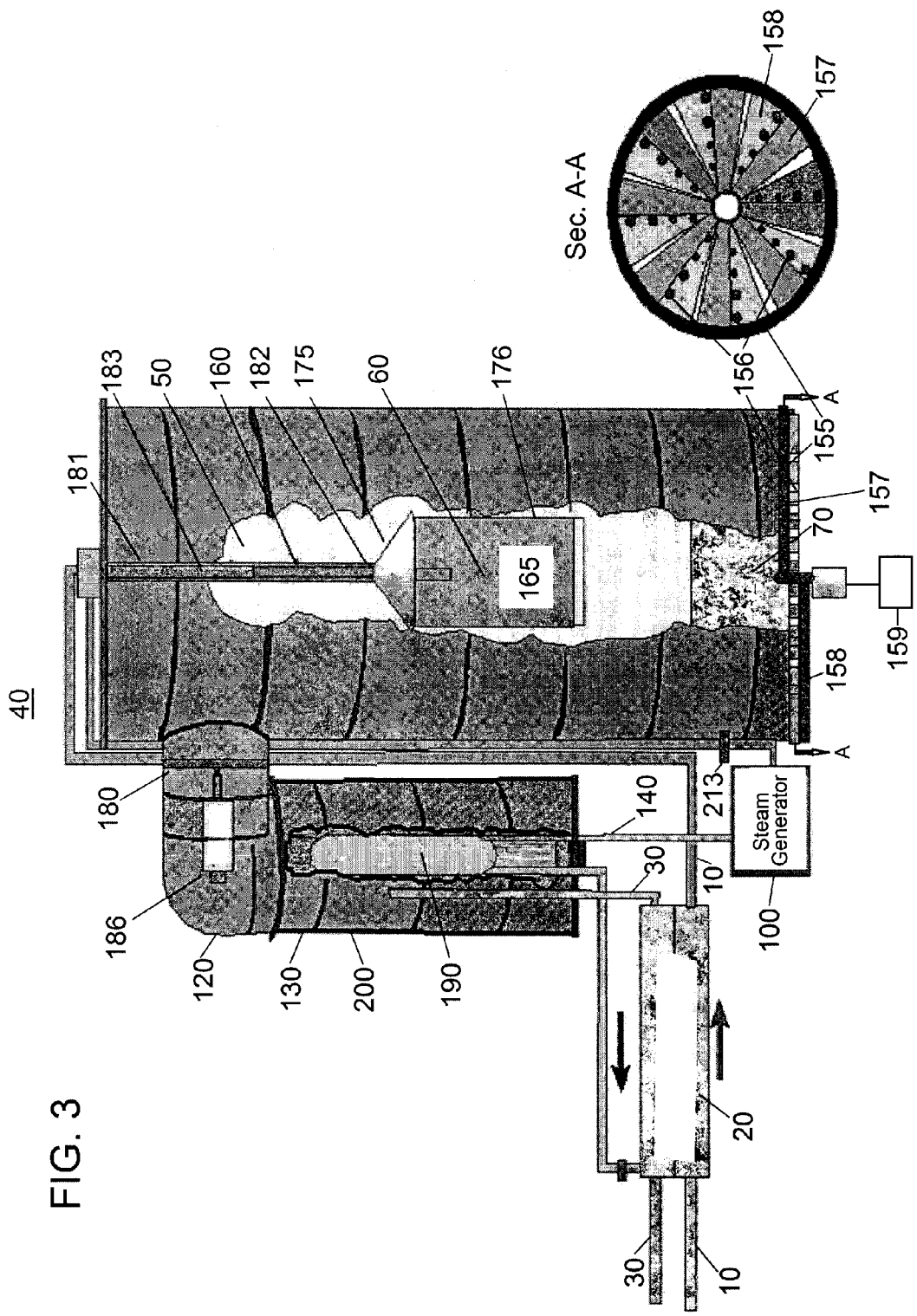
FIG. 3 is a schematic representation of an alternative embodiment of a desalination plant having a cone-shaped evaporation unit in accordance with the present invention.

FIG. 3 schematically illustrates an alternative embodiment of the present invention, In this embodiment, seawater or brackish water also enters the desalination plant via line 10 and heat exchanger 20 to raise its temperature prior to introduction into the primary evaporation chamber 50. Here, the seawater receiving tank 160 and silicone chords 170 of the FIG. 2 embodiment are replaced by and evaporation unit 165. The evaporation unit includes a cone-shaped upper seawater distribution surface 175, having a non-adherent surface coating of silicone. A lower cylindrical shell 176, extending downward from the cone 175 and being open at its bottom, extends the surface area for the seawater to traverse while water is being evaporated from the seawater. During operation, seawater exiting the heat exchanger 20 enters the primary evaporation chamber 50 via a concentric pipe arrangement. The pipes are arranged such that the seawater travels through outer pipe 181 down to the top surface of the cone 175, where it emerges through perforations 182 in outer pipe 181 and is evenly distributed across the upper surface of cone 175. As the seawater traverses pipe 181, it is further preheated by heat energy received from steam being conveyed through inner concentric pipe 183 from steam generator 100. The steam in pipe 183 is injected into steam injection section 160 inside the evaporation unit 165, releasing additional heat energy to the underside of cone 175 and the inner surfaces of cylindrical shell 176 to further aid in evaporation of water from the seawater. The accumulated steam ultimately leaves the evaporation unit through its open bottom, joining the steam environment within evaporation chamber 50.

As in the previous embodiment, steam extracted from the primary evaporation chamber 50 may pass through a turbine 180, which in this embodiment turns an electrical generator 186 to generate electrical energy and thus remove energy from the steam to aid in conditioning the steam for condensation. In order to further increase the efficiency of the desalination plant, here the heat exchanger 190 located in the secondary pressure vessel 130 receives a portion of the fresh water which has passed through seawater heat exchanger 20. Because this fresh water has been partially cooled by the seawater as it passed through heat exchanger 20, it is cooler than the steam in the secondary pressure vessel 130. As this cooler water then passes through condensation heat exchanger 190, the fresh water receives heat from the steam, helping cool the steam to the point of condensation, while also raising the temperature of the fresh water. The re-heated fresh water is then fed to steam generator 100 to receive additional heat energy before being passed back into the primary evaporation chamber 50 via inner concentric pipe 183. In this way, the substantial heat energy contained in this fresh water is recaptured and reintroduced back into the desalination plant to improve overall plant efficiency.

The desalination plant embodiment in FIG. 3 also schematically illustrates an alternative to use of a salt auger to remove accumulated salts from the bottom of primary pressure vessel 40. The bottom plate 155 of the primary pressure vessel is provided with a plurality of holes 156 arrayed about the plate through which accumulated salt may pass from brine collection section 70. Flow through these holes 156 is controlled by a corresponding plurality of blades in blade sets 157, 158, shown in cross-section A-A. The blades within the brine collection section 70 are arranged to cover the holes 156 to preclude passage of salt and to retain steam within the primary pressure vessel 40 when closed, and to permit passage of salt through the holes 156 when the blade set is rotated about its center axis. Corresponding blade set 158 covers the bottoms of holes 156. The blade sets 157, 158 may be operated, preferably by a computer controller 159, in a manner which permits controlled extraction of salts while maintaining containment of the pressure within the primary pressure vessel 40. For example, when salt extraction is desired, upper blade set 157 may be rotated to expose the holes 156 to the brine collection section 70, while lower blade set 158 is maintained in the closed position. Once the holes 156 are filled with salts, upper blade set 157 may be rotated to the closed position covering the tops of holes 156, followed by rotation of lower blade set 158 to its open position to allow the salts to exit the holes 156. Alternatively, if the accumulated salts are sufficiently deep and viscous, both blade sets may be rotated to their open positions if the pressure within the primary pressure vessel 40 is not high enough to violently eject the salts and vent the steam atmosphere out of the pressure vessel. In any event, due to the potential for personnel injury and plant damage, computer control of the operation of the blade sets 157, 158 to ensure coordinated, safe operation of the salts removal apparatus is desired.

One of ordinary skill will recognize that this approach to salt extraction is not limited to the holes 156, but may include any alternative which provides adequate steam environment containment, such as holes connected to tubes extending away from the primary pressure vessel 40, with a containment device equivalent to lower blade set 158 being located away from the bottom of the pressure vessel 40 (e.g., a remotely-located blade set or a set of individual valves).

The foregoing disclosure has been set forth merely to illustrate the invention and is not intended to be limiting. For example, the supplemental energy required to maintain the steam environment in the primary evaporation chamber may be supplied, at least in part, by high temperature steam from a vapor compression system. Because other such modifications of the disclosed embodiments incorporating the spirit and substance of the invention may occur to persons skilled in the art, the invention should be construed to include everything within the scope of the appended claims and equivalents thereof.

What is claimed is:

1. A method for producing fresh water from salt water, comprising:
   introducing liquid salt water into a salt water distribution head within an evaporation portion of a primary pressure vessel, the distribution head including a salt water receiving component having a non-adherent surface over which salt water is dispersed;
   maintaining a steam environment in the evaporation portion by direct steam injection;
   wherein steam is injected below the distribution head
   evaporating at least a portion of the water from the salt water dispersed over non-adherent surface by transferring energy from the steam environment to the water in the salt water, wherein the evaporated water from the salt water enters the steam environment;
   extracting steam from the steam environment in the evaporation portion into a condensing vessel; and
   condensing the steam extracted from the steam environment into fresh water
   wherein the direct steam injection conveys sufficient energy into the primary pressure vessel to compensate for heat energy removed from the primary pressure vessel by the steam which is extracted from the evaporation portion.

2. The method of producing fresh water of claim 1, wherein in the maintaining a steam environment step, the steam environment is maintained by supplying steam from an energy supplementing apparatus to a supplemental energy injection portion of the primary pressure vessel.

3. The method of producing fresh water of claim 2, wherein the energy supplementing apparatus includes a steam generator.

4. The method of producing fresh water of claim 3, wherein the steam generator receives at least one of steam and liquid water for heating and injection into the supplemental injection portion from at least one of the evaporation portion of the pressure vessel and the condensation vessel.

5. The method of producing fresh water of claim 1, wherein in the extracting step, the steam from the evaporation portion is passed through a turbine which extracts energy from the steam and exhausts the steam into the condensation vessel.

6. The method of producing fresh water of claim 1, wherein in the condensing step, energy is transferred from the steam received from the evaporation portion to a heat exchanger.

7. The method of producing fresh water of claim 6, wherein the energy transferred to the heat exchanger is received by contaminated water flowing to the distribution head receiving tank.

* * * * *